(12) United States Patent
Gu et al.

(10) Patent No.: US 11,919,232 B2
(45) Date of Patent: Mar. 5, 2024

(54) PROCESS FOR SHAPING A POLYMERIC OBJECT

(71) Applicant: SABIC GLOBAL TECHNOLOGIES B.V., Bergen op Zoom (NL)

(72) Inventors: Hao Gu, Geleen (NL); Richard Schouwenaar, Geleen (NL); Zahir Bashir, Geleen (NL); Lanti Yang, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 527 days.

(21) Appl. No.: 17/058,280

(22) PCT Filed: May 10, 2019

(86) PCT No.: PCT/EP2019/062007
§ 371 (c)(1),
(2) Date: Nov. 24, 2020

(87) PCT Pub. No.: WO2019/224016
PCT Pub. Date: Nov. 28, 2019

(65) Prior Publication Data
US 2021/0129428 A1  May 6, 2021

(30) Foreign Application Priority Data
May 25, 2018  (EP) .................................... 18174313

(51) Int. Cl.
| | |
|---|---|
| *B29C 64/153* | (2017.01) |
| *B29C 64/223* | (2017.01) |
| *B29C 64/245* | (2017.01) |
| *B29C 64/35* | (2017.01) |
| *B33Y 10/00* | (2015.01) |
| *B33Y 70/10* | (2020.01) |
| B29K 67/00 | (2006.01) |
| B29K 105/00 | (2006.01) |

(52) U.S. Cl.
CPC .......... *B29C 64/153* (2017.08); *B29C 64/223* (2017.08); *B29C 64/245* (2017.08); *B29C 64/35* (2017.08); *B33Y 10/00* (2014.12); *B33Y 70/10* (2020.01); B29K 2067/003 (2013.01); B29K 2067/006 (2013.01); B29K 2067/046 (2013.01); B29K 2105/0008 (2013.01); B29K 2105/251 (2013.01)

(58) Field of Classification Search
CPC ... B29C 64/141; B29C 64/153; B29C 64/223; B29C 64/40; B29C 64/245; B29K 2067/003; B29K 2067/006; B29K 2067/046; B29K 2105/0008; B29K 2105/251
See application file for complete search history.

(56) References Cited

U.S. PATENT DOCUMENTS

2007/0132158 A1*  6/2007  Martinoni .............. C08J 7/0427
                                                    264/497
2018/0200959 A1*  7/2018  Medeiros Araujo ........................
                                                    B29C 64/273

FOREIGN PATENT DOCUMENTS

| DE | 29624498 U1 | 7/2004 | |
| GB | 2518044 A * | 3/2015 | ............ B22F 3/1055 |
| GB | 2518044 A | 3/2015 | |

OTHER PUBLICATIONS

International Search Report for the corresponding International Application No. PCT/EP2019/062007; International Filing Date: May 10, 2019; dated Aug. 12, 2019. 3 pages.

(Continued)

*Primary Examiner* — Joseph S Del Sole
*Assistant Examiner* — Jamel M Nelson
(74) *Attorney, Agent, or Firm* — CANTOR COLBURN LLP

(57) ABSTRACT

The present invention relates to a process for moulding a polymeric object, the process comprising the steps of: (a) providing a substantially flat horizontally positioned layer of a material, the layer being a film or sheet; (b) providing a layer of a thermoplastic powder onto the layer provided under (a); (c) subjecting a pre-defined part of the thermoplastic powder to irradiation to heat the pre-defined part of the thermoplastic powder to a temperature at which the thermoplastic fuses or sinters onto at least a part of the flat layer of material; (d) terminating the exposure to irradiation; (e) providing a further layer of the thermoplastic powder onto the layer provided under (b); (f) subjecting a pre-defined part of the thermoplastic powder of the layer provided under (e) to irradiation to heat the pre-defined part of the thermoplastic powder to a temperature at which the thermoplastic fuses or sinters onto at least a part of the flat layer of the material fused under (c); (g) terminating the exposure to irradiation; (h) repeating steps (e)-(g) for as many cycles as required to complete the shape of the desired polymeric object; (i) removing the fraction of thermoplastic powder that has not been fused or sintered; and (j) optionally removing the substantially flat layer as provided under (a) from the polymeric object; wherein the surface area of the substantially flat layer of material is at least 200% of the surface area of that layer produced under steps (c)-(h) having the largest surface area. Such process allows for the production of small series or uniquely designed objects at low energy consumption wherein the objects exhibit high dimensional stability.

15 Claims, No Drawings

(56) References Cited

OTHER PUBLICATIONS

Written Opinion for the corresponding International Application No. PCT/EP2019/062007; International Filing Date: May 10, 2019; dated Aug. 12, 2019. 6 pages.

* cited by examiner

PROCESS FOR SHAPING A POLYMERIC OBJECT

CROSS-REFERENCE TO RELATED APPLICATIONS

This application is a 371 of PCT/EP2019/062007, filed May 10, 2019, which claims benefit of European Patent Application No. 18174313.9 filed on May 25, 2018.

The present invention relates to a process for shaping a polymeric object. In particular, the invention relates to a process for shaping a polymeric object by means of additive shaping. The process according to the present invention provides a means for shaping objects at a low processing temperature wherein the objects that are produced demonstrate a desirably high dimensional stability.

Polymeric materials are known to be very suitable for the production of objects having a wide variety of shape characteristics, and can be used to produce objects having very complicated shapes. Furthermore, polymeric materials are well known for their ability to induce very desirable material properties to the objects in which they are employed. Particularly suitable and widespread polymeric materials are the thermoplastic polymeric materials, also referred to as thermoplastics. Thermoplastics are materials that, when heated to a certain temperature, demonstrate a certain degree of fluidity, as a result of which they can be converted into a desired shape at such increased temperature in a fluid phase, where upon cooling the materials regains its solid state and can be utilised as a solid object.

This property of thermoplastics allows for a wide variety of shaping methods. It is well-established to perform the shaping of thermoplastics to desired objects using moulds comprising one or more internal cavity into which the thermoplastic in liquid phase is poured or forced into, where upon cooling the mould can be opened and the desired object obtained. One such technique for shaping is injection moulding. Further, it is also well-established that continuous shapes, such as tubes and rods, may be produced from thermoplastics in their liquid phase by forcing the liquid thermoplastic to pass through an opening of certain shape, followed by subsequent cooling to solidify, thereby obtaining an object that is shaped according to the dimensions of the opening. This is referred to as extrusion moulding, and is also a widely operated shaping method.

Whist the shaping techniques as above referred to are indeed well-established, there are certain disadvantages to them. One particular property of the above presented techniques is that they are particularly designed for producing a massive quantity of objects all having the very same dimensions. Suitable and even desirable as that may be for a wide variety of applications, there is an increasing demand to be able to produce objects in low quantities, so in small series, or even unique objects, where these objects still require to have very accurately defined dimensions. The shaping techniques above cannot be economically used for such purposes for various reasons, amongst others including the large capital investment involved as moulds for injection moulding as well as dies for extrusion moulding are costly to manufacture and can only return their cost when large volumes of objects are produced.

A further disadvantage of the above presented shaping techniques is that the freedom in design of the shape of the objects that are to be produced is subject to certain limitations. In design, one has to consider how the moulds are to be filled with the liquid material, as well as how the objects are to be retrieved from the moulds. This introduces certain shape limitations to the presented shaping techniques.

In recent years, shaping techniques have been subject to development that allow for production of objects in small series and of very complicated shapes by so-called additive manufacturing. In such techniques, one is no longer bound by the form of the mould, as the shape is obtained by formation of a solid element from a material in a liquid or liquefied form, at a pre-defined location where the object to be formed requires a certain quantity of material to be deposited. Such formation of a solid element may be by for example liquefaction of a thermoplastic powder material and subsequent solidification. Such techniques are commonly also referred to as '3D-printing'. Particularly suitable 3D-printing methods are for example selective laser sintering and high-speed sintering. In such additive manufacturing techniques, an article commonly is built by a layered method in the x-y plane, where layers are piled and consolidated in the z or vertical direction.

There are various methods according to which additive manufacturing processes may be performed. A particularly desirable method is known as selective sintering. In such processes, a volume of powder of a thermoplastic material is provided, and subjected to a localised and controlled source of energy, allowing a pre-defined quantity of the powdery material at a pre-defined position within the volume of powder to be heated to a temperature at which the material physically connects, for example by fusing or sintering. Upon removal of the source of energy, the temperature of the material decreases again, and forms (a part of) an object.

Particularly, the controlled source of energy that is utilised in such process may be a laser energy source. In such set-up, the process is commonly addressed as selective laser sintering, abbreviated to SLS. Alternatively, the controlled source of energy that is utilised in such process may be an infrared light source. In such set-up, the process is commonly addressed as high speed sintering, abbreviated to HSS. Selective sintering processes commonly operate in that the volume of powder is introduced onto a surface to form a powder layer, followed by subjecting a defined portion of the powder in that layer to the energy to an extent that the sintering or fusing takes place, upon which a further layer of powder is provided, where again the selective sintering in that layer is performed. This procedure may be repeated multiple times as required on the basis of the shape of the object to be formed.

Upon completing of the number of cycles required to shape the desired object, the formed object may be removed from the volume in which it is produced, which may also referred to as the 3D-printer. In the 3D-printer as used in HSS or SLS processes, a quantity of thermoplastic powder that has not been fused to form the object remains, and may be collected for further use in a subsequent shaping step according to the invention, or in an alternative application, depending on the thermal history of the material. Typically, in a printing cycle, only about 20 wt % of the powder is converted to the article, the remaining powder acting as support for the article during the build stage. The remaining powder has nevertheless been exposed to heat fora prolonged period, such as for example 10 to 100 hours.

Whilst the above presented clearly indicates the merits of 3D-printing processes, there are and remain ongoing needs for developing the materials and processes employed in these techniques. Aspects that are of particular desire for further development and optimisation include for example the energy consumption during the shaping process and the re-usability of the thermoplastic powder material, so as to reduce the quantity of waste material that originates from the process. Waste powder in the context of the present invention may be understood to be material that cannot be reused on its own in a further 3D-printing cycle due to for example severe degradation, where it would lead to printing defects if used so. The present invention addressed these aspects in particular, and provides a process that allows for both a reduction of the energy required in shaping as well as increasing the re-usability of the thermoplastic powder that has not been sintered but which has been exposed to heat, whilst still allowing objects with desired shapes and dimensional stability to be manufactured.

This is now achieved according to the invention by a process for shaping a polymeric object, the process comprising the steps of:
(a) providing a substantially flat horizontally positioned layer of a material, the layer being a film or sheet;
(b) providing a layer of a thermoplastic powder onto the layer provided under (a);
(c) subjecting a pre-defined part of the thermoplastic powder to irradiation to heat the pre-defined part of the thermoplastic powder to a temperature at which the thermoplastic fuses or sinters onto at least a part of the flat layer of material;
(d) terminating the exposure to irradiation;
(e) providing a further layer of the thermoplastic powder onto the layer provided under (b);
(f) subjecting a pre-defined part of the thermoplastic powder of the layer provided under (e) to irradiation to heat the pre-defined part of the thermoplastic powder to a temperature at which the thermoplastic fuses or sinters onto at least a part of the flat layer of the material fused under (c);
(g) terminating the exposure to irradiation;
(h) repeating steps (e)-(g) for as many cycles as required to complete the shape of the desired polymeric object;
(i) removing the fraction of thermoplastic powder that has not been fused or sintered; and
(j) optionally removing the substantially flat layer as provided under (a) from the polymeric object;
wherein the surface area of the substantially flat layer of material is larger than the surface area of that layer produced under steps (c)-(h) having the largest surface area.

For example, the surface area of the substantially flat layer of material may be at least 110% of the surface area of that layer produced under steps (c)-(h) having the largest surface area, preferably at least 150%, more preferably at least 200%.

A substantially flat horizontally positioned layer of a material may in the context of the present invention be understood to be for example an anchoring film, to which the shaped material may be anchored in the course of the 3D-printing process.

Such shaping process, wherein as a base layer a substantially flat horizontally positioned layer of a material, such as an anchoring layer, is provided onto which the object to be produced is printed, results in an improvement of the dimensional stability of the shape that is manufactured, and indeed in the feasibility of the printing process. As a result of that, the manufacturing may be performed at reduced powder temperature, which in processes where such base layer is not provided would lead to deformation, warping and curling of the shaped object, and thus not allow for an object having desired dimensions to be manufactured, or even not to allow printing at all. Curling is a defect wherein the outer perimeters of a sheet-like object or part of an object there is an upward curl. This would not only detrimentally impact the shape quality of the object to be produced, but also may cause the printing process to be impacted or even stopped as the deposition of a subsequent layer of powder on top of a layer that already has been subjected to energy exposure can be impacted by curled parts protruding upwards, i.e. in the z-direction.

In SLS, the powder in the build bed is kept at certain elevated temperature, wherein the laser then provides heat in the scanned area to tip the powder above the $T_g$ or $T_m$ of the polymer. There is an optimal temperature for the powder in the build table, which depends on the material that is used. Usually, in SLS shaping of a semi-crystalline thermoplastic powder, the powder in the build bed is kept at about 5-30° C. below the DSC melting peak, $T_m$, of the polymer. For example, if PET powder is used, the build bed would be kept at about 225-228° C., which is about 25° C. below the $T_m$. If PA-12 powder is used, the powder would be kept in the build bed at 168-173° C., which is close to the $T_m$ of PA-12. Generally, printing with lower build bed temperatures than optimal for the material leads to increased curl.

In HSS, the build bed is kept closer to the $T_m$ or $T_g$ of the polymer. This is because the heat for sintering of the area, which is absorbed by a radiation absorbing material present in the polymer composition, such as carbon black, is provided by an infrared energy source, such as an infrared lamp, such as a moving infrared lamp. Lowering of the temperature of the build bed also results in curl.

By being able to manufacture an object at a lower temperature, the quantity of energy that is utilised by the shaping process may be reduced. The thermoplastic powder that is provided to the shaping process needs not be heated or only to a lesser degree, so that the energy consumption that results therefrom is reduced.

A further advantage of not subjecting the thermoplastic powder to pre-heating, or to a lesser degree, is that its thermal history is not negatively affected by such heating. This is in particular important for the degree to which the non-fused powder from the shaping process can be re-used in a subsequent 3D printing cycle. To be able to selectively sinter or fuse during a shaping process such as the SLS process, the powder material has to have certain material characteristics including molecular weight and crystallinity characteristics, that may be negatively affected by thermal exposure. For instance, the molecular weight of the thermoplastic powder can increase drastically, which would lead to inferior flow properties and poor sintering. Prolonged heating may also induce discolouration of the powder. Thus, a process that minimises exposure of the powder to thermal degradation allows the materials to be subsequently re-used without affecting significantly the print quality of the article. This presents another benefit of the process of the present invention.

Irradiation may be done by exposing the thermoplastic material to electromagnetic radiation such as infrared or near-infrared radiation. Such irradiation may for example be done using radiation having a wavelength of ≥100 nm and ≤100 µm, preferably ≥500 nm and ≤15 µm, more preferably ≥700 nm and ≤5 µm. Such processes are known as selective sintering processes. Typically, a carbon dioxide infrared laser with wavelength of 10.2 µm may be used in SLS. Ultra-violet lasers may also be used.

In such selective sintering processes, the irradiation may for example be done using an infrared or near-infrared curing lamp, infrared or near-infrared light emitting diodes, or a laser source. Such irradiation may for example be done using laser irradiation. The irradiation may for example be provided by a localised energy source, preferably a laser energy source.

Selective sintering processes may for example include processes where only a selected fraction of the material is subjected to radiation; alternatively, selective sintering may be achieved by applying a layer of a radiation absorbing material onto the area of the thermoplastic material that is to be sintered, and subsequently subjecting the surface area of the thermoplastic material, including the area to which the radiation absorbing material is not applied, to an irradiation source. Such selective sintering processes include for example high speed sintering (HSS) processes.

Selective sintering processes where only a selected fraction of the material is subjected to radiation include for example processes where irradiation may for example be done using laser irradiation. One technique for laser irradiation sintering of a predefined portion of a material such as a thermoplastic material is selective laser sintering (SLS). In SLS, a powder such as a powdery thermoplastic is positioned on a bed, where a laser source irradiates those portions of the powdery thermoplastic on the bed as indicated by the CAD model of the object, in that way sintering or melting the thermoplastic material in that area. The sintered or molten material may then adhere to the thermoplastic material of a lower positioned layer. This positioned lower layer may be a layer previously formed by the SLS process. In this way, the desired object may be produced layer by layer.

In the context of the present invention, a substantially flat horizontally positioned layer is to be understood to be a film or sheet layer, such as a sheet having a thickness of 5-1000 µm. For example, the substantially flat layer may be a sheet having a thickness of 5-500 µm, preferably 10-100 µm, more preferably 10-70 µm. Such layer, in particularly a layer of such thickness, which commonly is not part of the shape of the desired object, can be easily peeled away from the shaped object after the shaping process, thereby obtaining the object in the form as initially desired, without damaging the object. Surprisingly, it was found that a layer made by sintering the required area of a monolayer of thermoplastic powder via HSS or SLS was sufficient for building the part subsequently over it, at desirably low temperatures, without curl. Multiple layers may also be used to make the layer.

The substantially flat horizontally positioned layer has a surface area larger than the surface area of that layer produced under steps (c)-(h) having the largest surface area. Using a layer having such ratio of surface area to the surface area of the layers produced in the 3D-printing process itself allows for the dimensional stability of the shaped object to be as desired, in that the warpage and curling are reduced. Preferably, the substantially flat horizontally positioned layer has a surface area of at least 250% of the surface area of that layer produced under steps (c)-(h) having the largest surface area, more preferably at least 300%, even more preferably at least 350%. Preferably, the substantially flat horizontally positioned layer has a surface area of at least 200% and at most 1000% of the surface area of that layer produced under steps (c)-(h) having the largest surface area, more preferably at least 200% and at most 500%, even more preferably at least 250% and at most 400%.

In a particularly desired embodiment of the present invention, the substantially flat layer of material is produced by providing a layer of a thermoplastic powder onto a surface; subjecting a pre-defined part of the thermoplastic powder to irradiation to heat the pre-defined part of the thermoplastic powder to a temperature at which the thermoplastic fuses or sinters; and terminating the exposure to irradiation, to form a film or sheet.

In such embodiment, the base layer or anchor layer that is to provide the dimensional accuracy to the object as it is formed may be produced in the same cycle of shaping as is the object itself. The base layer may be printed first, and the object itself may be further printed onto the base layer in one single operation. Alternatively, a sheet may be provided as base layer that has been manufactured in a separate shaping process, and the 3D printing of the desired object may be performed onto that sheet as per the process of the present invention. In the embodiment where the base layer is produced in the same cycle of shaping as the object itself, there may be an improved security of movement of the layer and reduced displacement when the roller from the powder reservoir is rolled over it to provide the next powder layer, i.e. the layer that is intended for the start of the object building process. Such base layer may be printed at the standard temperature for the material in HSS or SLS, or at the lowered temperature used for the part building.

In certain embodiments, the process may involve repeating steps (a)-(h) after step (h) for one or more further cycles, wherein the substantially flat horizontally positioned layer(s) of a material provided in the subsequent cycle(s) (a)-(h) is(are) positioned on top of the fused layer obtained from the preceding step (h). The process according to such embodiments allows for incorporating more layers than only one base or anchor layer that further support the provision of increased dimensional accuracy to the shaped object.

Preferably, the thermoplastic powder that is provided under steps (b) and (e) is heated to a temperature of at most 50° C. below the peak melting temperature as determined via differential scanning calorimetry (DSC), first heating run, according to ISO 11357-3 (2011), prior to subjecting to the irradiation, more preferably of at most 75° C. below the peak melting temperature, even more preferably of at most 100° C. below the peak melting temperature.

It is preferred that the substantially flat layer is produced from the same material as the thermoplastic powder.

The thermoplastic powder may for example be produced from a composition comprising one or more thermoplastic material(s) selected from poly(ethylene terephthalate), poly(ethylene naphthalate), poly(butylene terephthalate), polylaurolactam, polyamide-11 or polyacetal. Alternatively, the thermoplastic powder may for example be produced from a composition comprising one or more thermoplastic material(s) selected from polyolefins, such as polyethylenes or polypropylenes, polycarbonates, polymethylmethacrylates, polystyrenes, polyvinyl chloride, poly(acrylonitrile-butadiene-styrene) (ABS), or polylactic acid. Alternatively, the thermoplastic powder may for example be produced from a composition comprising one or more thermoplastic material(s) selected from polyphenylene sulphide, polyphenylene oxide, polyetherimide, or polyetheretherketone. The thermoplastic powder may for example be produced from a composition comprising thermoplastic material(s) wherein the thermoplastic material(s) in the composition are selected from semi-crystalline thermoplastics, preferably selected from poly(ethylene terephthalate), poly(ethylene naphthalate), poly(butylene terephthalate), polylaurolactam, polyamide-11 and polyacetal. For example, the thermoplastic powder may be produced from a composition comprising ≥80.0 wt % of one or more thermoplastic material, with regard to the total weight of the composition, preferably at least 90.0 wt %, more preferably at least 95.0 wt %, even more preferably at least 98.0 wt %. For example, the thermoplastic powder may be produced from a composition comprising at least 80.0 wt % of one or more thermoplastic material(s) selected from poly(ethylene terephthalate), poly(ethylene naphthalate), poly(butylene terephthalate), polylaurolactam, or polyacetal, with regard to the total weight of the composition, preferably at least 90.0 wt %, more preferably at least 95.0 wt %, even more preferably at least 98.0 wt %.

For example, the thermoplastic powder may be produced from a composition comprising poly(ethylene terephthalate). For example, the thermoplastic powder may be produced from a composition comprising at least 80.0 wt % poly(ethylene terephthalate) with regard to the total weight of the composition, preferably at least 90.0 wt %, more preferably at least 95.0 wt %, even more preferably at least 98.0 wt %. Such poly(ethylene terephthalate) may for example be a homopolymer or a copolymer. Such poly(ethylene terephthalate) may for example have an intrinsic viscosity of $\geq 0.55$ dl/g, preferably $\geq 0.80$ dl/g, more preferably $\geq 1.00$ dl/g, even more preferably $\geq 1.10$ dl/g. Such poly(ethylene terephthalate) may for example have an intrinsic viscosity of $\leq 2.50$ dl/g, preferably $\leq 2.00$ dl/g, more preferably $\leq 1.50$ dl/g. Such poly(ethylene terephthalate) may for example have an intrinsic viscosity of $\geq 0.55$ and $\leq 2.50$ dl/g, preferably $\geq 0.80$ and $\leq 2.00$ dl/g. The intrinsic viscosity may be determined in accordance with ASTM D2857-95 (2007). Poly(ethylene terephthalates) having such intrinsic viscosity may show a good combination of melt flow and strength of the shaped object, and may contribute to the dimensional accuracy of the object.

For example, the thermoplastic powder may be produced from a composition comprising poly(butylene terephthalate). For example, the thermoplastic powder may be produced from a composition comprising at least 80.0 wt % poly(butylene terephthalate) with regard to the total weight of the composition, preferably at least 90.0 wt %, more preferably at least 95.0 wt %, even more preferably at least 98.0 wt %. Such poly(butylene terephthalate) may for example be a homopolymer or a copolymer. Such poly(butylene terephthalate) may for example have an intrinsic viscosity of $\geq 0.55$ dl/g, preferably $\geq 0.80$ dl/g, more preferably $\geq 1.00$ dl/g, even more preferably $\geq 1.10$ dl/g. Such poly(butylene terephthalate) may for example have an intrinsic viscosity of $\leq 2.50$ dl/g, preferably $\leq 2.00$ dl/g, more preferably $\leq 1.50$ dl/g. Such poly(butylene terephthalate) may for example have an intrinsic viscosity of $\geq 0.55$ and $\leq 2.50$ dl/g, preferably 0.80 and $\leq 2.00$ dl/g. The intrinsic viscosity may be determined in accordance with ASTM D2857-95 (2007).

In a further embodiment, the thermoplastic powder may be produced from a composition comprising polylaurolactam or polyamide-11. For example, the thermoplastic powder may be produced from a composition comprising at least 80.0 wt % polylaurolactam or polyamide-11 with regard to the total weight of the composition, preferably at least 90.0 wt %, more preferably at least 95.0 wt %, even more preferably at least 98.0 wt %.

The composition may further comprise $\geq 0.01$ and $\leq 5.0$ wt % of one or more flow agent selected from silica, alumina, phosphate, borate, titania, talc, mica, kaolin, attapulgite, calcium silicate, and magnesium silicate, with regard to the total weight of the composition.

The thermoplastic powder may for example have a mean particle volume size of $\geq 10$ and $\leq 300$ μm as determined in accordance with ISO 9276-2 (2014). For example, the thermoplastic powder may have a $D_{10}$ of $\geq 5$ and $\leq 50$ μm, a $D_{50}$ of $\geq 50$ and $\leq 150$ μm, and a $D_{90}$ of $\geq 160$ and $\leq 300$ μm, as determined in accordance with ISO 9276-2 (2014).

The process according to the invention may for example be performed using a moulding device comprising a horizontal flat surface surrounded by a wall allowing for the powder that is provided under steps (b) and (e) to be contained by the volume V defined by the horizontal flat surface and the wall, wherein the horizontal flat surface can be lowered stepwise to extend the height of the wall thereby increasing the volume V. Preferably, the horizontal flat surface is positioned prior to step (b) such that the height of the wall surrounding the surface is 25-250 μm, preferably 40-200 μm, more preferably 50-150 μm. In a particular embodiment of the invention, the horizontal flat surface can be lowered in steps of 25-250 μm, preferably 40-200 μm, more preferably 50-150 μm. For example, the horizontal flat surface may be lowered following each of steps (d) and (g).

In a particular embodiment, the present invention also relates to a shaped object produced according to the process of the present invention.

The invention will now be illustrated by the following non-limiting examples.

Shaping experiments were performed using a polyethylene terephthalate homopolymer (PET) having an intrinsic viscosity of 1.12 dl/g. The PET had a particle size distribution defined by having a $D_{10}$ of 39 μm, a $D_{50}$ of 94 μm, a $D_{90}$ of 188 μm, and a mean particle volume size of 107 μm, determined in accordance with ISO 9276-2 (2014). The PET has a peak melt temperature, first heating run $T_{p,m}$ as determined in accordance with ISO 11357-3 (2011) of 251° C.

The above materials were subjected to a selective laser sintering process using a Mini-SLS machine comprising a $CO_2$ laser source. During each laser sintering process, 4 square plates of 30×30×2 mm were produced. 0.05 wt % Aerosil 200 flow promoter was added to the powder. The materials were pre-dried prior to processing via SLS. The SLS process was conducted in an atmosphere having an oxygen content of $\leq 1.0$ wt %. The SLS process conditions are presented in table 1.

TABLE 1

Standard 'high temperature' SLS process conditions for PET powder, used in Comparative Example 1. All four plates printed satisfactorily with all four powers, and only a single scan was needed.

| Operational | Setting |
|---|---|
| Build bed temperature | 228° C. |
| Piston temperature | 185° C. |
| Cylinder temperature | 145° C. |
| Feed temperature | 160° C. |
| Laser source | $CO_2$ |
| Laser power, plates 1 | 12 W |
| Laser power, plate 2 | 18 W |
| Laser power, plate 3 | 24 W |
| Laser power, plate 4 | 30 W |
| Laser scan speed | 5 m/s |
| Laser hatch distance | 150 μm |
| Number of scans | 1 |
| Layer thickness | 100 μm |
| Cooling time (min) | 60 |
| Article (square plate) dimensions, L × W × T | 30 mm × 30 mm × 2 mm |

In Table 1, the following definitions pertain:
Build bed temperature: the temperature of the powder at the surface of the build area.
Piston temperature: the temperature of the platform (up/down) of the building area
Cylinder temperature: the temperature of the surrounding cylinder of the building area
Feed temperature: the temperature of the powder at the surface of the feeding area (powder reservoir) from which the roller feeds the build area.

Experiments were performed with PET powder, lowering in Table 2 only the build bed temperatures. As the build bed temperature is lowered below 200° C., the printing can only be done by pre-locating an in situ printed anchor film. Note that the piston temperature also decreases when the build area temperature lower than 185° C. The piston temperature becomes the same as the build area temperature when it is lower than 185° C.

In the inventive experiments, a first powder layer covering the piston was subjected to laser sintering in its entirety, thereby providing a base or anchoring layer of 12×12 cm in the form of a film having a thickness of ~100 μm, onto which further shaping of the objects was performed by the SLS process, the shaping to be done in the form of four squares of 3×3 cm with thickness of 2 mm each, positioned centrally onto the base layer, with a 2 cm gap between the four squares, so that 4 cm of the base layer extended beyond the printed samples. Note that the base layer was printed at the same lowered temperature as used for the article building. However, it is also possible to pre-print the base layer at the standard temperature (that is, high temperature, 228° C. for PET, see Table 1), and then continue with subsequent printing of the article at the low temperature. For the comparative examples, no base layer was provided, and the sample squares were directly printed onto the powder in the build area.

Table 2 shows the results of lowering the build-bed temperature for PET powder, with and without, base layer film. Comparative Example 2 shows when the build bed temperature was lowered to 200° C. from the standard setting of 228° C. (Comparative Example 1), it was not possible to print plates 1-4 even with a double scan, due to curl.

Table 2, Example 3 shows the effect of the invention, whereby a build-bed temperature of 200° C. was used as in Comparative Example 2, but a base film was printed first at 200° C., and then the plates were printed over it. Now with single scans of 35 or 40 W, it was possible to print good plates. In Example 4, a build-bed temperature of 200° C. was used, but a base film was printed first, and then the plates were printed over it with double scans; with scans of 35 W+35 W and 40 W+40 W, it was possible to print good squares.

In Table 2, Example 5, the bed temperature was lowered to 190° C., a base film was printed at 190° C., and with double scans of 35 W+40 W and 40 W+40 W, it was possible to complete the printing with good parts.

In Table 2, Example 6, the bed temperature was lowered further to 180° C., a base film was printed at 180° C. according to the inventive step, and with double scans of 45 W+45 W or 45 W+40 W, it was possible to complete the printing with good parts.

In Table 2, Example 7, the bed temperature was lowered further to 170° C., a base film was printed at 170° C. according to the inventive step, and with double scans of 45 W+45 W or 45 W+40 W, it was possible to complete the printing with good parts.

Table 2, Examples 8 and 9, the bed temperature was lowered further to 160° C. and 150° C. respectively, a base film was printed according to the inventive step at the same temperatures, and with double scans of 45 W+45 W and 45 W+40 W, it was possible to complete the printing of the square plates. However, the entire parts curved due to rapid cooling. It may be possible with some optimisation to even work with such low temperatures.

Thus, the examples 3-7 in Table 2 for PET show that the build bed print temperatures can be reduced very substantially. Prolonged temperatures of the powder in the build bed can cause changes in the polymer. In the case of PET,

TABLE 2

The PET plates were scanned with different powers and number of scans. When a single number is given for the laser power, it means a single scan. A double scan is indicated by two numbers. For example, 40 + 45 means a first scan with 40 W and a repeat scan over the selected area with 45 W. All other parameters were kept as in Table 1. When print completion was not possible, it was due to curl.

| Example | Building area temperature (° C.) | Base film printing | Laser power (watts) | | | | Print completion with good quality |
| --- | --- | --- | --- | --- | --- | --- | --- |
| | | | Plate 1 | Plate 2 | Plate 3 | Plate 4 | |
| Comp. ex. #2 | 200 | 0 (no film) | 25 + 25 | 30 + 30 | 35 + 35 | 40 + 40 | Not possible for plates 1-4 |
| #3 | 200 | 16.5 | 25 | 30 | 35 | 40 | Possible for plates 3 and 4 |
| #4 | 200 | 16.5 | 25 + 25 | 30 + 30 | 35 + 35 | 40 + 40 | Possible for plates 3 and 4 |
| #5 | 190 | 16.5 | 25 + 40 | 30 + 40 | 35 + 40 | 40 + 40 | Possible for plates 3 and 4 |
| #6 | 180 | 25 | 45 + 45 | 30 + 45 | 35 + 45 | 40 + 45 | Possible for plates 1 and 4 |
| #7 | 170 | 25 | 45 + 45 | 30 + 45 | 35 + 45 | 40 + 45 | Possible for plates 1 and 4 |
| #8 | 160 | 25 | 45 + 45 | 30 + 45 | 35 + 45 | 40 + 45 | Print completed but entire part curved due to fast cooling. |
| #9 | 150 | 25 | 45 + 45 | 30 + 45 | 35 + 45 | 40 + 45 | Print completed but entire part curved due to fast cooling. | temperatures above 180° C. cause molecular weight increase due to solid state polycondensation; the higher the temperature, the faster the rise in molecular weight. A double scan doubles the build time, however reaction rates approximately halve for every 10° C. decrease, thus by decreasing the build temperature from 228° C. to 200° C., the molecular weight build up is substantially reduced. Example 3 in Table 2 shows for PET at 200° C., a single scan is sufficient to build the part.

Upon completion of the printing process, the base layers of the samples in experiments 3-9 were easily peeled off, without damaging the plates.

The invention is further illustrated with polyamide 12 (PA 12), a well established material for SLS and HSS. PA 12 suffers even faster rise in molecular weight in heat exposed powder, thus limiting its re-use. Lower build temperature for printing would thus be very beneficial for extending the use of the unsintered but heat-exposed powder. First Table 3 shows the standard or optimal process for SLS with PA 12. Curl is not an issue. Table 4 shows the results for lowering the build bed temperature for PA 12, with and without the base film.

TABLE 3

Comparative Example 10 (C), standard SLS processing conditions for PA 12 powder (without anchor film).

| Operational | Setting |
| --- | --- |
| Build bed temperature | 170° C. |
| Piston temperature | 135° C. |
| Cylinder temperature | 135° C. |
| Feed temperature | 120° C. |
| Laser source | $CO_2$ |
| Laser power | 20-22 W |
| Laser scan speed | 5 m/s |
| Laser hatch distance | 150 μm |
| Number of scans | 1 |
| Layer thickness | 100 μm |
| Cooling time (min) | Same as printing time | completed and the part dimensions are good. Comparative Example 11 (C) in Table 4 shows the effect of lowering the build bed temperature from 170° C. to 160° C. Due to curl, it was not possible to complete the printing of the square plates at any power setting.

Example 12 shows the effect of printing an in situ film layer first as taught in the invention, and then printing the plates over it, with the build temperature at 160° C. Unlike Comparative Example 11 (C), the curl was not a problem and the square plate could be printed satisfactorily with all four powers.

Example 13 shows the effect of printing an in situ film layer first as taught in the invention, and then printing the plates over it, with the build temperature lowered to 155° C. Still, the curl was not a problem and the square plate could be printed satisfactorily for plates 2-4.

Example 14 shows the effect of printing an in situ film layer first as taught in the invention, and then printing the plates over it, with the build temperature lowered to 150° C. Still, the curl was not a problem and the square plate could be printed satisfactorily for plates 2-4.

Example 15 shows the effect of printing an in situ film layer first as taught in the invention, and then printing the plates over it, with the build temperature lowered to 145° C. Still, the curl was not a problem and the square plate could be printed satisfactorily for power settings 3 and 4.

Example 16 shows the effect of printing an in situ film layer first as taught in the invention, and then printing the plates over it, with the build temperature lowered to 140° C. Still, the curl was not a problem for power settings 3 and 4.

For polyamide 12, not only is there energy saving in having a lower build-bed temperature, there is much scope to reduce the molecular weight rise in the unsintered but heat-exposed powder left after a building episode.

In general, as the build bed temperature is lowered, and the difference between it and Tm increases, higher laser

TABLE 4 results of lowering build bed temperature for PA 12 powder, with and without base layer film. Only a single scan was needed for PA 12 even when the build bed temperature was lowered below the standard one (170° C.).

| Example | Building area temperature (° C.) | Base film printing* | Laser power (watts) | | | | Print completion with good quality |
| --- | --- | --- | --- | --- | --- | --- | --- |
| | | | Plate 1 | Plate 2 | Plate 3 | Plate 4 | |
| Comp. ex. #11 | 160 | 0 (no film) | 17 | 20 | 23 | 26 | Not possible for plates 1-4 |
| #12 | 160 | 15 | 17 | 20 | 23 | 26 | Possible for plates 1-4 |
| #13 | 155 | 15 | 17 | 20 | 23 | 26 | Possible for plates 2-4 |
| #14 | 150 | 15 | 17 | 20 | 23 | 26 | Possible for plates 2-4 |
| #15 | 145 | 15 | 17 | 20 | 23 | 26 | Possible for plates 3 and 4 |
| #16 | 140 | 17 | 17 | 20 | 23 | 26 | Possible for plates 3 and 4 |
| #8 | 130 | 17 | 20 | 23 | 26 | 29 | Not possible for plates 1-4 |

Polyamide 12 is a very good material for SLS, but it shows a marked rise in molecular weight; for example the molecular weight approximately doubles within 1-2 h at the optimal or standard processing conditions, where the bed is at 170° C. Comparative Example 10 (C) in Table 3 shows the standard processing conditions for polyamide 12, with the build bed temperature at 170° C. where the print can be powers are needed. However, as the difference between the lowered bed temperature and the Tm was relatively smaller for PA 12 than for PET, the PA 12 part could be printed with a single scan, providing the base film was pre-printed before the part building.

Accordingly, it can be understood from the above that producing a shaped object according to the method of the invention, results in objects having desirable shape stability properties while printing can be performed at reduced powder bed temperatures, thereby reducing energy consumption as well as preventing the unfused powder to be subjected to high heat. This increases the refresh rate for the powder, being the ability to re-use the unfused powder in a subsequent SLS cycle, and thereby increasing the material efficiency of the process.

The invention claimed is:

1. A process for shaping a polymeric object, the process comprising the steps of:
   (a) providing a substantially flat horizontally positioned layer of a material, the layer being a film or sheet;
   (b) providing a layer of a thermoplastic powder onto the substantially flat horizontally positioned layer provided under (a);
   (c) exposing a pre-defined part of the thermoplastic powder to irradiation to heat the pre-defined part of the thermoplastic powder to a temperature at which the thermoplastic fuses or sinters onto at least a part of the substantially flat horizontally positioned layer of material;
   (d) terminating the exposure to irradiation;
   (e) providing a further layer of the thermoplastic powder onto the layer provided in the previous step of providing a layer of the thermoplastic powder;
   (f) exposing a pre-defined part of the thermoplastic powder of the layer provided under (e) to irradiation to heat the pre-defined part of the thermoplastic powder to a temperature at which the thermoplastic fuses or sinters onto at least a part of the flat layer of the material fused under the previous step of fusing or sintering;
   (g) terminating the exposure to irradiation;
   (h) repeating steps (e)-(g) for as many cycles as required to complete the shape of the desired polymeric object;
   (i) removing a fraction of the thermoplastic powder that has not been fused or sintered; and
   (j) optionally removing the substantially flat horizontally positioned layer as provided under (a) from the polymeric object;
   wherein the surface area of the substantially flat horizontally positioned layer of material is larger than the surface area of the layer produced under steps (c)-(h) having the largest surface area, wherein the process involves repeating steps (a)-(h) after step (h) for one or more further cycles, wherein the substantially flat horizontally positioned layer(s) of a material provided in the subsequent cycle(s) (a)-(h) is(are) positioned on top of the fused thermoplastic obtained from the preceding step (h).

2. The process according to claim 1, wherein the substantially flat horizontally positioned layer of material is produced by providing a layer of the thermoplastic powder onto a surface; subjecting a pre-defined part of the thermoplastic powder to irradiation to heat the pre-defined part of the thermoplastic powder to a temperature at which the thermoplastic fuses or sinters; and terminating the exposure to irradiation, to form a film or sheet.

3. The process according to claim 1, wherein the substantially flat horizontally positioned layer is produced from the same material as the thermoplastic powder.

4. The process according to claim 1, wherein the thermoplastic powder that is provided under steps (b) and (e) is heated to a temperature of at most 50° C. below the peak melting temperature as determined via differential scanning calorimetry (DSC), first heating run, according to ISO 11357-3 (2011), prior to subjecting to the irradiation.

5. The process according to claim 1, wherein the thermoplastic powder is produced from a composition comprising one or more thermoplastic material(s) selected from semi-crystalline thermoplastics.

6. The process according to claim 5, wherein the composition comprises ≥80.0 wt % of the one or more thermoplastic material, with regard to the total weight of the composition.

7. The process according to claim 5, wherein the composition further comprises ≥0.01 and ≤5.0 wt % of one or more flow agent selected from silica, alumina, phosphate, borate, titania, talc, mica, kaolin, attapulgite, calcium silicate, and magnesium silicate, with regard to the total weight of the composition.

8. The process according to claim 1, wherein the process is performed using a moulding device comprising a horizontal flat surface surrounded by a wall allowing for the powder that is provided under steps (b) and (e) to be contained by the volume V defined by the horizontal flat surface and the wall, wherein the horizontal flat surface can be lowered stepwise to extend the height of the wall thereby increasing the volume V.

9. The process according to claim 8, wherein the horizontal flat surface is positioned prior to step (b) such that the height of the wall surrounding the surface is 25-250 μm.

10. The process according to claim 8, wherein the horizontal flat surface can be lowered in steps of 25-250 μm.

11. The process according to claim 8, wherein the horizontal flat surface is lowered following each of steps (d) and (g).

12. The process according to claim 1, wherein the irradiation is provided by a localised energy source.

13. The process according to claim 1, wherein:
    the thermoplastic powder has a mean particle volume size of ≥10 and ≤300 μm as determined in accordance with ISO 9276-2 (2014); and/or
    the thermoplastic powder has a $D_{10}$ of ≥5 and ≤50 μm, a $D_{50}$ of ≥50 and ≤150 μm, and a $D_{90}$ of ≥160 and ≤300 μm, as determined in accordance with ISO 9276-2 (2014).

14. The process according to claim 12 wherein the localized energy source is a laser energy source or a moving infrared lamp.

15. The process according to claim 5 wherein the composition comprises poly(ethylene terephthalate), poly(ethylene naphthalate), poly(butylene terephthalate), polyamide-11, polylaurolactam, or polyacetal.

* * * * *